United States Patent
Herda

(10) Patent No.: US 10,274,810 B2
(45) Date of Patent: Apr. 30, 2019

(54) PARAMETRIC CONVERSION OF CHIRPED FEMTOSECOND PUMP PULSES

(71) Applicant: Toptica Photonics AG, Grafelfing (DE)

(72) Inventor: Robert Herda, München (DE)

(73) Assignee: TOPTICA PHOTONICS AG, Grafelfing (DE)

( * ) Notice: Subject to any disclaimer, the term of this patent is extended or adjusted under 35 U.S.C. 154(b) by 0 days.

(21) Appl. No.: 15/927,393

(22) Filed: Mar. 21, 2018

(65) Prior Publication Data

US 2018/0275488 A1    Sep. 27, 2018

Related U.S. Application Data

(60) Provisional application No. 62/474,211, filed on Mar. 21, 2017.

(51) Int. Cl.
*G02F 1/39* (2006.01)
*G02F 1/35* (2006.01)
(Continued)

(52) U.S. Cl.
CPC .............. *G02F 1/39* (2013.01); *G02F 1/3536* (2013.01); *G02F 1/395* (2013.01); *H01S 3/0057* (2013.01);
(Continued)

(58) Field of Classification Search
CPC .......... G02F 1/3536; G02F 1/39; G02F 1/395; H01S 3/0057; H01S 3/067
See application file for complete search history.

(56) References Cited

U.S. PATENT DOCUMENTS 7,405,868 B2 *  7/2008  Kaertner ................. G02F 1/133
                                                      359/330
8,390,921 B2 *  3/2013  Kaertner .................. G02F 1/39
                                                      359/330

(Continued)

OTHER PUBLICATIONS

Gottschall, Thomas et al., "Four-wave-mixing-based optical parametric oscillator delivering energetic, tunable, chirped femtosecond pulses for non-linear biomedical applications," Optics Express vol. 23, No. 18, pp. 23968-23977 (2015).*

*Primary Examiner* — Daniel Petkovsek
(74) *Attorney, Agent, or Firm* — Raymond R. Ferrera; Adams and Reese LLP

(57) ABSTRACT

An apparatus for generating laser pulses by non-linear four-wave mixing, including a pump laser source to emit a pump beam of femtosecond laser pulses at a pump wavelength, the pump laser source configured to couple the pump beam into a first beam path and an idler beam into a second beam path; a chirp unit to receive the pump beam from the pump laser source configured to temporally stretch the laser pulses, wherein the chirp unit is arranged in the first beam path before a parametric conversion unit; and wherein the parametric conversion unit receives the pump beam from the chirp unit and is configured to produce a signal beam at a signal wavelength by four-wave mixing in a non-linear optical medium, the parametric conversion unit receiving the idler beam via the second beam path, and the pump beam and the idler beam being superimposed in the non-linear optical medium.

20 Claims, 4 Drawing Sheets
(3 of 4 Drawing Sheet(s) Filed in Color)

(51) Int. Cl.
*H01S 3/00* (2006.01)
*H01S 3/067* (2006.01)
*H01S 3/11* (2006.01)
*H01S 3/16* (2006.01)

(52) U.S. Cl.
CPC .......... *G02F 2203/11* (2013.01); *H01S 3/067* (2013.01); *H01S 3/1106* (2013.01); *H01S 3/1608* (2013.01)

(56) References Cited

U.S. PATENT DOCUMENTS

| | | | |
|---|---|---|---|
| 9,250,497 B2 * | 2/2016 | Hugonnot | G02F 1/39 |
| 2012/0093519 A1 * | 4/2012 | Lipson | G01J 11/00 398/157 |
| 2014/0247448 A1 * | 9/2014 | Wise | G01N 21/65 356/301 |
| 2018/0046060 A1 * | 2/2018 | Hugonnot | G02F 1/39 |
| 2018/0143510 A1 * | 5/2018 | Naka | G02F 1/3501 |

* cited by examiner

PARAMETRIC CONVERSION OF CHIRPED FEMTOSECOND PUMP PULSES

FIELD OF THE INVENTION

The invention relates to an apparatus and to a method for generating laser pulses by non-linear four-wave mixing.

BACKGROUND OF THE INVENTION

Short laser pulses are required in numerous applications. Fiber lasers that are commercially available today at comparatively low cost are typically used for the generation of short lasers pulses at a variety of different wavelengths.

Fiber lasers are lasers using optical fibers as gain media. In most cases, the gain medium is a fiber doped with rare earth ions such as erbium ($Er^{3+}$), neodymium ($Nd^{3+}$), ytterbium ($Yb^{3+}$), thulium ($Tm^{3+}$), or praseodymium ($Pr^{3+}$), and one or several fiber-coupled laser diodes are used for pumping. The wavelength of the generated laser radiation depends on the dopant of the gain medium. Further wavelengths can be reached by non-linear frequency conversion, such as, e.g., second harmonic generation.

However, in the range of wavelengths accessible with mature, available rare earth doped fiber lasers and their second harmonic frequencies there is a gap extending between 800 nm and 1000 nm and between 1100 nm and 1500 nm. On the other hand, it is particularly these wavelength ranges in which there is an increasing demand for laser sources, as e.g. in the field of Biophotonics.

A well-known means to generate laser radiation at 'uncommon' frequencies is non-linear four-wave mixing (FWM) in step index fibers [2] or in photonic crystal fibers [1]. In these approaches, optical parametric amplifiers (OPAs) are usually pumped by a picosecond laser with a narrow bandwidth. However, a downside of this technique is that picosecond fiber lasers are difficult to set up, mainly due to the absence of compact pulse compression schemes.

On the other hand, ultrafast laser platforms are readily available on the market which are adapted for generating femtosecond pulses. These are, e.g., rare earth doped fiber lasers emitting at 1.05 μm or 1.55 μm (with pulse durations typically in the range from 90 to 150 fs). However, it is very difficult to obtain parametric gain starting from femtosecond pulses, because supercontinuum generation dominates the non-linear frequency generation. FIG. 1a shows the evolution of the FWM process in the non-linear medium using femtosecond pump pulses (pulse duration of 100 fs) at a wavelength of 1560 nm. The non-linear medium used for parametric conversion is a highly non-linear fiber (HNLF) of known type. The parametric process is seeded by chirped femtosecond pulses at a wavelength of 1960 nm (idler signal). As it can be seen from the diagram of FIG. 1a, the generated signal radiation at 1280 nm is strongly structured from the beginning because the generation of a supercontinuum is dominating the process. It is not possible to compress the spectrum of the radiation at 1280 nm to short pulse durations and therefore it is not usable for most applications.

SUMMARY OF THE INVENTION

From the foregoing it is readily appreciated that there is a need for an improved laser source for the generation of short pulses at particular wavelengths. It is thus an object of the invention to provide a technique which enables the generation of short laser pulses in the wavelength ranges between 800 nm and 1000 nm or between 1100 nm and 1500 nm based on a FWM process using a rare earth doped femtosecond laser as a pump source.

According to the invention, an apparatus for generating laser pulses by non-linear four-wave mixing is disclosed. The apparatus comprises:

a pump laser source to emit a pump beam of femtosecond laser pulses at a pump wavelength;

a chirp unit to receive the pump beam from the pump laser source and configured to temporally stretch the laser pulses, preferably to a duration of one or more picoseconds; and a parametric conversion unit to receive the pump beam from the chirp unit and configured to produce a signal beam at a signal wavelength by four-wave mixing in a non-linear optical medium.

The invention is based on the insight that undesirable supercontinuum generation can be avoided by temporally stretching the laser pulses of the pump beam to a duration in the range of a few picoseconds, depending on the pulse energy. This is effected by the chirp unit which generates a frequency dependent phase delay (chirp). Supercontinuum generation is prevented and FWM dominates the non-linear process. In this way, the invention enables the generation of short pulses at different wavelength by non-linear FWM using a femtosecond pulse laser as pump source.

According to the invention, the parametric conversion may take place in an optical parametric amplifier (OPA) or an optical parametric oscillator (OPO). In the latter case, the non-linear optical medium is positioned in a an optical cavity.

In a preferred embodiment of the invention, the pump laser source is configured to couple the pump beam into a first beam path and an idler beam into a second beam path. The chirp unit is arranged in the first beam path before the parametric conversion unit. The parametric conversion unit receives the idler beam via the second beam path such that the pump beam and the idler beam are superimposed in the non-linear optical medium. In this embodiment, both the pump beam and the idler beam are generated by the same femtosecond pulse laser. No separate source is required for seeding the FWM process. Within the meaning of the invention, the signal wavelength may be shorter or longer than the pump wavelength. Correspondingly, as the case may be, the idler wavelength (the wavelength of the idler beam) may be longer or shorter than the pump wavelength. Both signal and idler wavelength are longer than the pump wavelength.

According to another preferred embodiment, the apparatus of the invention comprises a wavelength shifting unit arranged in the second beam path between the pump laser source and the parametric conversion unit to shift the wavelength of the laser radiation of the idler beam. The wavelength of the radiation of the pump source coupled into the second beam path can be shifted to the required wavelength in a straight forward fashion, e.g., by Raman soliton self-frequency shifting in a section of non-linear, anomalous dispersive optical fiber.

According to yet another preferred embodiment, a first optical amplifier is arranged in the first beam path to amplify the laser pulses of the pump beam prior to reception by the parametric conversion unit. The first optical amplifier can amplify the pump pulses to a power level of one Watt or more, for example by a known chirped pulse amplification scheme.

In a further preferred embodiment of the invention, an optical modulator, such as, e.g., an electro-optical modulator (EOM), is arranged in the first or second beam path to modulate the amplitude of the pump beam, the signal beam or the idler beam. This enables modulation of the generated signal beam as required by the respective application.

In another preferred embodiment, an (optionally adjustable) optical delay line is arranged in the first or second beam path to generate a temporal delay of the laser pulses propagating in the respective beam path. The optical delay line serves the purpose of producing a required delay of the laser pulses propagating along the respective beam path to achieve optimal temporal coincidence of the pump pulses and the idler pulses in the non-linear optical medium of the parametric conversion unit.

In still another preferred embodiment of the invention, the apparatus comprises a second optical amplifier arranged in the second beam path to amplify the laser pulses of the idler beam prior to reception by the parametric conversion unit. The generated signal beam can be tuned with respect to the signal wavelength by tuning the idler wavelength. The idler wavelength, in turn, can be tuned by adjusting the pump power of the second optical amplifier. To achieve this, the wavelength shifting unit may be arranged in the second beam path between the second optical amplifier and the parametric conversion unit, wherein the laser pulses of the idler beam are generated as Raman-shifted solitons.

According to yet another preferred embodiment, a dispersive optical element is arranged in the second beam path to temporally stretch the laser pulses of the idler beam. E.g., a photonic crystal fiber may be used as a dispersive optical element. The temporal duration of the idler pulses should correspond to the temporal duration of the pump pulses to optimize the efficiency of the parametric conversion.

Preferably, the non-linear optical medium of the parametric conversion unit is constituted by a section of optical fiber. E.g., a section of highly non-linear optical fiber may be used as the non-linear conversion element which generates the signal beam from the pump and idler beams by a FWM process.

The chirp unit of the apparatus of the invention should ideally comprise an adjustable dispersive optical element. In this way, the chirp and temporal duration of the pump pulses may be tuned. It turns out that the spectral width of the laser radiation of the signal beam can be adjusted by tuning the chirp of the pump pulses. The chirp of the pump pulses may be tuned in a range from the anomalous dispersion regime to the normal dispersion regime.

In a preferred embodiment of the invention, the pump wavelength is 1.5-1.6 µm. Rare earth doped femtosecond fiber lasers that emit in this wavelength range are well-established and commercially available. They allow to generate the signal radiation in the interesting wavelength range of 1.1-1.45 µm by employing the approach of the invention.

Alternatively, the pump wavelength may be 1.02-1.08 µm. Rare earth doped femtosecond fiber lasers that emit in this wavelength range are well-established and commercially available as well. In this case, the signal radiation can be generated according to the invention in the also interesting wavelength range of 0.75-0.98 µm.

In both cases, the duration of the laser pulses emitted by the pump source should be 50-250 fs, preferably 90-150 fs. These femtosecond pump pulses are then temporally stretched in the chirp unit to a duration of 0.5-5 ps, preferably 1-3 ps, most preferably approx. 2 ps.

The invention does not only relate to an apparatus but also to a method for generating laser pulses by non-linear four-wave mixing. The method comprises the steps of:

generating a pump beam of femtosecond laser pulses at a pump wavelength;
temporally stretching the laser pulses of the pump beam;
providing the stretched laser pulses of the pump beam to a non-linear optical medium to produce a signal beam at a signal wavelength by four-wave mixing in the non-linear optical medium.

Preferably, the pump beam and an idler beam of laser radiation at an idler wavelength are superimposed in the non-linear optical medium to take part in the four-waving mixing process. Therein, the signal wavelength may be tuned by variation of the idler wavelength, as described above.

In a possible embodiment, the idler beam and/or the signal beam are provided to the non-linear optical medium by a feedback from the four-wave mixing process. In this embodiment, an optical parametric oscillator (OPO) is used for the parametric conversion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The enclosed drawings disclose preferred embodiments of the present invention. It should be understood, however, that the drawings are designed for the purpose of illustration only and not as a definition of the limits of the invention. In the drawings:

According to the invention, laser radiation at a desired signal wavelength is generated by FWM in a highly non-linear fiber (HNLF), wherein a femtosecond fiber laser (emitting, e.g., at 1.05 µm or 1.55 µm) is used as a pump source. Useful parametric gain from 100-fs laser pulses cannot be obtained because supercontinuum generation dominates the nonlinear frequency generation. FIG. 1a shows the evolution of the FWM Process with an un-chirped pump pulse at 1560 nm in HNLF. The process is seeded by an idler beam of chirped femtosecond pulses at a wavelength of 1960 nm. As it can be seen in FIG. 1a, the generated signal radiation at 1280 nm is very structured, because the generation of a supercontinuum dominates the process. It is not possible to compress the spectrum at 1280 nm to required short pulse durations and therefore this approach it is not usable.

Figure 1:
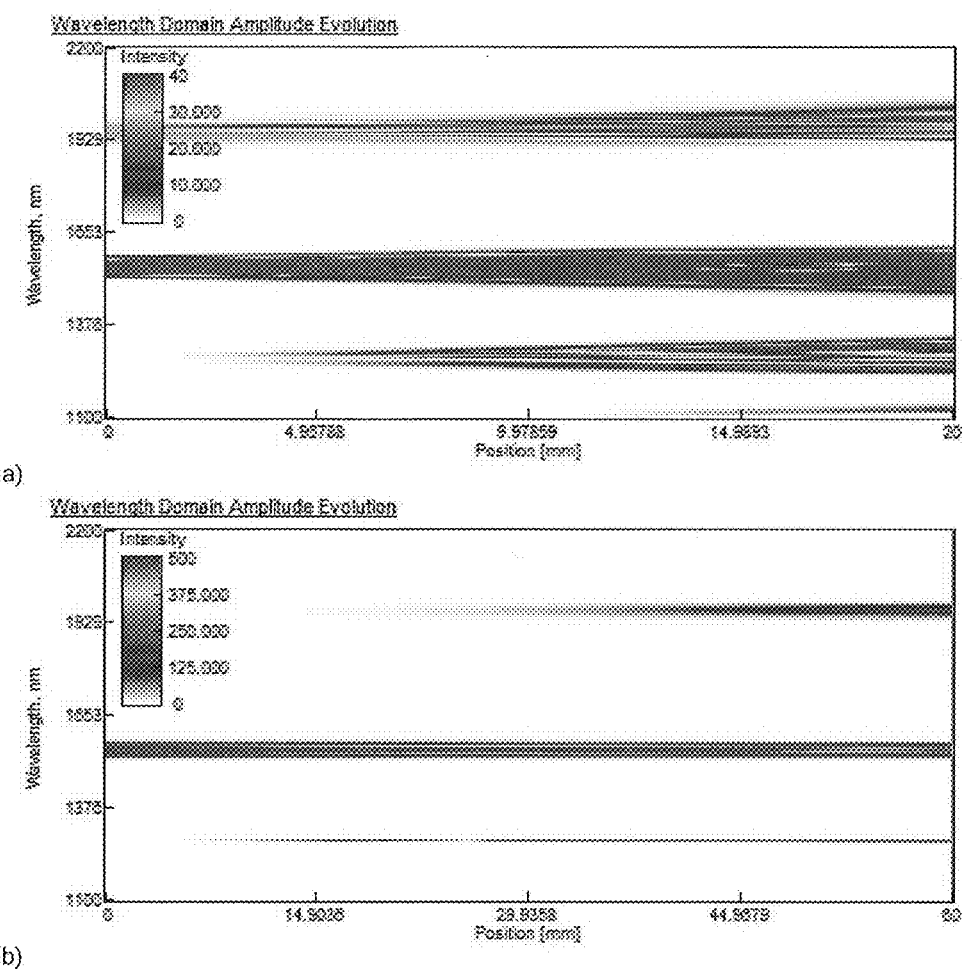
FIG. 1 illustrates the FWM process in a section of highly non-linear fiber.

The solution to avoid supercontinuum generation according to the invention is to chirp the pump pulses to a picosecond pulse duration. Supercontinuum generation is prevented and FWM dominates the process. The corresponding evolution can be seen in FIG. 1b. The difference to the situation shown in FIG. 1a is that the pump pulses at 1560 nm are stretched to a duration of 2 ps. Signal pulses compressible down to about 400 fs with a conversion efficiency of about 40% at a signal wavelength of 1280 nm can be generated with a narrow spectral peak, as seen in FIG. 1b.

Figure 2:
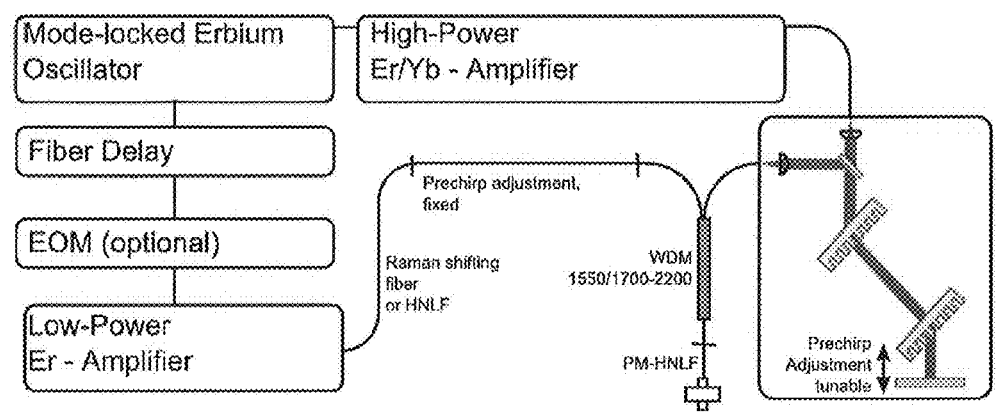
FIG. 2 schematically shows the apparatus of the invention as a block diagram.

FIG. 2 schematically shows an embodiment of the apparatus of the invention as a block diagram. The apparatus comprises a pump laser source ('mode-locked erbium oscillator') to emit a pump beam of femtosecond laser pulses of 150 fs pulse duration at a pump wavelength of 1560 nm. The pump beam is coupled into a first beam path (to the right in FIG. 2) and an idler beam into a second beam path (downwards in FIG. 2). A first optical amplifier ('high-power Er/Yb-amplifier') is arranged in the first beam path to amplify the laser pulses of the pump beam. The first optical amplifier receives the pump pulses at 150 fs and applies a chirp to stretch the pump pulses to a duration of about 20 ps. The stretched pump pulses are amplified to Watt level. Provision is made for an adjustable arrangement of two dispersive elements (gratings) to adjustably recompress the pump pulses to a duration of about 2 ps. The combination of the first optical amplifier and the adjustable grating pair thus constitutes a chirp unit within the meaning of the invention which receives the pump beam from the pump laser source and is configured to temporally stretch the laser pulses to a picosecond duration. A section of polarization maintain HNLF ('PM-HNLF') is provided as a non-linear optical medium which receives the pump beam from the chirp unit via a WDM element. A signal beam is generated in the HNLF at a signal wavelength by four-wave mixing. The HNLF thus constitutes a parametric conversion unit according to the invention. Moreover, an idler beam is provided to the HNLF via the second beam path. The pump beam and the idler beam are superimposed in the HNLF to take part in the FWM process. An optical delay line ('fiber delay') is arranged in second beam path to generate a temporal delay of the laser pulses propagating in the second beam path in order to achieve optimum coincidence of the pump and idler beams in the HNLF. A second optical amplifier ('low-power Er-amplifier') is arranged in the second beam path to amplify the laser pulses of the idler beam. The amplified idler pulses are fed into a wavelength shifting unit ('Raman shifting fiber or HNLF') arranged in the second beam path between the pump laser source and the parametric conversion unit to shift the wavelength of the laser radiation of the idler beam to the required idler wavelength. Further, a section of dispersive optical fiber ('prechirp adjustment, fixed') is arranged in the second beam path to temporally stretch the laser pulses of the idler beam. An electro-optical modulator ('EOM') is arranged in the second beam path to modulate the amplitude of the idler beam, whereby the modulation of the signal beam is enabled.

Figure 3:
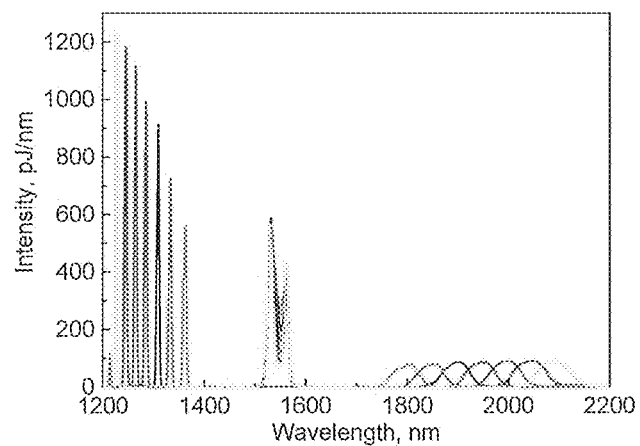
FIG. 3 illustrates the tuning of the signal wavelength by adjusting the idler wavelength in the FWM scheme of the invention.

FIG. 3 illustrates the spectrum of wavelengths of the pump, idler, and signal beams in the conversion scheme of the invention. Raman-shifted solitons are preferably used in the idler beam. On this basis, the wavelength of the signal beam at 1200-1400 nm can be tuned by adjusting the pump power of the second optical amplifier, whereby the central wavelength of the idler beam is varied in the range of 1700-2200 nm. Alternatively, a wavelength shift by adjusting the central wavelength of a solitonic peak of a supercontinuum in a section of HNLF would be possible.

Figure 4:
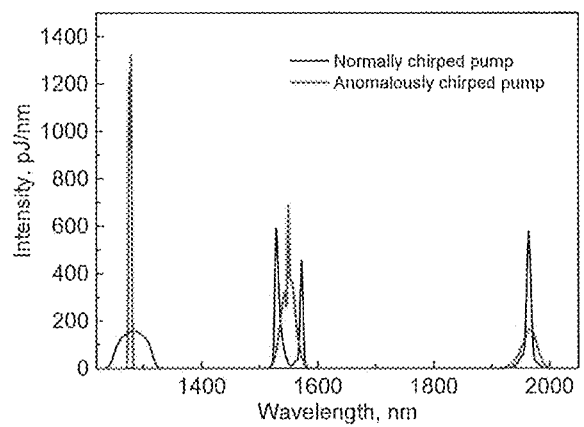
FIG. 4 illustrates the adjustability of the spectral bandwidth of the signal radiation by variation of the chirp of the pump beam.

As shown in FIG. 4, the spectral width of the signal radiation can be influenced by appropriate modification of the chirp of the pump radiation (from normal to anomalous chirp). The pulse duration of the signal pulses is mainly determined by the pulse duration of the pump pulses. The chirp of these pulses can be manipulated in a wide range by adjusting the signs of the chirp of the idler pulses and the pump pulses. The spectral width of the signal radiation can be adjusted in the example shown in FIG. 4 from 60 nm to 6 nm by only changing the grating separation (see FIG. 2). A continuous variation of the signal bandwidth can be achieved by adjusting both the pump and the idler chirp. Also the sign of the chirp of the signal radiation can be modified by adjusting both the pump and the idler chirp.

The FWM using chirped pump pulses can be analyzed theoretically by solving the corresponding coupled-amplitude differential-equation system. In the calculation, dispersive effects and pump depletion may be excluded. However, the phase of the pump pulse should be taken into account. If a parabolic pulse shape is assumed, a simple expression can be derived for the instantaneous frequency of the generated pulse:

$$\delta\omega(T,z) = -\frac{\partial \Phi_s(T,z)}{\partial T} = 2T\left[\frac{2C_p + z\gamma P_{p0}}{T_p^2} - \frac{C_i}{T_i^2}\right]$$

Here T is the time in the moving frame of the pulses, z is the position in the non-linear fiber in which the FWM process takes place, $\gamma$ is the nonlinear coefficient of the fiber, $\Phi_s(T,z)$ is the phase of the signal pulse, $C_p$ and $C_i$ are the chirps of the pump and idler pulses, respectively. $T_p$ and $T_i$ are the durations of the chirps of the pump and idler pulses, respectively. The chirp at the idler wavelength, which is used for seeding is determined by the fibers available in the used range, i.e., a negative chirp is obtained when using standard fiber with anomalous dispersion for stretching in the 2 μm range. When using a high power laser for pumping a grating compressor may be included allowing for an easy adjustment of the sign of the pump chirp. From the above equation for the signal chirp it can be seen that an upchirped case ($\omega(T,z)/T>0$), a downchirped case ($\omega(T,z)/T<0$) or an unchirped case ($\omega(T,z)/T=0$) can be obtained by only adjusting the chirp of the pump pulses $C_p$, e.g. by changing the grating separation.

Figure 5:
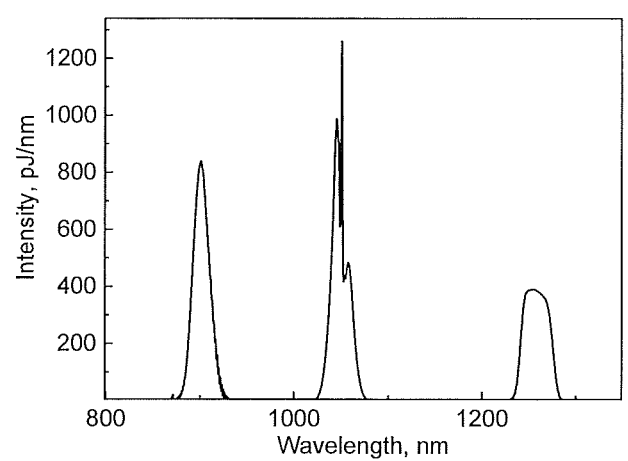
FIG. 5 illustrates the generation of signal radiation at 900 nm by the method of the invention.

Further advantages of the approach of the invention are:
A) High level of fiber integration
  Due to the stretching of the pump pulses, the peak powers when combining the idler and pump beams are moderate, therefore it is possible to use fiber components for combining them. In the embodiment shown in FIG. 2, the apparatus is almost completely fiber-based. Only the adjustable grating pair for adjusting the chirp of the pump pulses is a free-beam arrangement.
B) Scalability
  If a higher pump power is required, the concept of the invention is easily scalable because it is only necessary to increase the stretching of the pump and idler pulses.
C) Possibility of fast, fiber integrated switching
  If it is required to turn the signal beam off and on, no free-space high-power switches (like acusto-optical modulators) are necessary. A low power EOM in the idler path (as shown in FIG. 2) is sufficient to switch the high power signal on and off.
D) Setting up a 900 nm/1250 nm optical parametric amplifier (OPA) using a 1050 nm pump source
  Simulations show, that it is also possible to set up a fiber OPA that emits simultaneously at 900 nm/1250 nm when using a 1050 nm pump source and seeding it with an idler generated by a supercontinuum in a HNLF. The non-linear optical medium used for the FWM process may be a commercially available photonic crystal fiber (PCF) in this case. The simulation result is shown in FIG. 5.

REFERENCES

1. Sharping, J. E., Sanborn, J. R., Foster, M. a, Broaddus, D. & Gaeta, A. L. Generation of sub-100-fs pulses from a microstructure-fiber-based optical parametric oscillator. *Opt. Express* 16, 18050-18056 (2008).
2. Wong, G., Murdoch, S. & Leonhardt, R. High-conversion-efficiency widely-tunable all-fiber optical parametric oscillator. *Opt. Express* 15, 2947-2952 (2007).

The invention claimed is:

1. An apparatus for generating laser pulses by non-linear four-wave mixing, comprising:
 a pump laser source to emit a pump beam of femtosecond laser pulses at a pump wavelength, wherein the pump laser source is configured to couple the pump beam into a first beam path and an idler beam into a second beam path;
 a chirp unit to receive the pump beam from the pump laser source and configured to temporally stretch the laser pulses, wherein the chirp unit is arranged in the first beam path before a parametric conversion unit; and
 wherein the parametric conversion unit to receives the pump beam from the chirp unit and is configured to produce a signal beam at a signal wavelength by four-wave mixing in a non-linear optical medium, and further wherein the parametric conversion unit receives the idler beam via the second beam path, and the pump beam and the idler beam are superimposed in the non-linear optical medium.

2. The apparatus of claim 1, further comprising a wavelength shifting unit arranged in the second beam path between the pump laser source and the parametric conversion unit to shift the wavelength of the laser radiation of the idler beam.

3. The apparatus of claim 1, further comprising a first optical amplifier arranged in the first beam path to amplify the laser pulses of the pump beam prior to reception by the parametric conversion unit.

4. The apparatus of claim 1, wherein an optical modulator is arranged in the first or second beam path to modulate the amplitude of the pump beam, the signal beam or the idler beam.

5. The apparatus of claim 1, wherein an optical delay line is arranged in the first or second beam path to generate a temporal delay of the laser pulses propagating in the respective beam path.

6. The apparatus of claim 1, comprising a second optical amplifier arranged in the second beam path to amplify the laser pulses of the idler beam prior to reception by the parametric conversion unit.

7. The apparatus of claim 1, wherein a dispersive optical element is arranged in the second beam path to temporally stretch the laser pulses of the idler beam.

8. The apparatus of claim 1, wherein the non-linear optical medium is constituted by a section of optical fiber.

9. The apparatus of claim 1, wherein the chirp unit comprises an adjustable dispersive optical element.

10. The apparatus of claim 1, wherein the pump wavelength is 1.5-1.6 µm and the signal wavelength is 1.1-1.45 µm.

11. The apparatus of claim 1, wherein the pump wavelength is 1.02-1.08 µm and the signal wavelength is 0.75-0.98 µm.

12. The apparatus of claim 1, wherein the duration of the laser pulses emitted by the pump source is 50-250 fs.

13. The apparatus of claim 1, wherein the duration of the temporally stretched laser pulses of the pump beam is 0.5-5 ps.

14. The apparatus of claim 1, wherein the duration of the laser pulses emitted by the pump source is 90-150 fs.

15. The apparatus of claim 1, wherein the duration of the temporally stretched laser pulses of the pump beam is 1-3 ps.

16. The apparatus of claim 1, wherein the duration of the temporally stretched laser pulses of the pump beam is 2 ps.

17. A method for generating laser pulses by non-linear four-wave mixing, said method comprising the steps of:
 generating a pump beam of femtosecond laser pulses at a pump wavelength, wherein said generating a pump beam further comprises using a pump laser source configured to couple the pump beam into a first beam path and an idler beam into a second beam path,
 arranging a chirp unit in the first beam path before the parametric conversion unit, and
 using a parametric conversion unit to receive the idler beam via the second beam path,
 wherein the pump beam and the idler beam are superimposed in the non-linear optical medium;
 temporally stretching the laser pulses of the pump beam; and
 providing the stretched laser pulses of the pump beam to a non-linear optical medium to produce a signal beam at a signal wavelength by four-wave mixing in the non-linear optical medium.

18. The method of claim 17, wherein the pump beam and an idler beam of laser radiation at an idler wavelength are superimposed in the non-linear optical medium to take part in the four-waving mixing process.

19. The method of claim 18, wherein the signal wavelength is tuned by variation of the idler wavelength.

20. The method of claim 17, wherein at least one of the idler beam and the signal beam are provided to the non-linear optical medium by a feedback from the four-wave mixing process.

* * * * *